(12) United States Patent  
Cucala Garcia (10) Patent No.: US 9,450,738 B2  
(45) Date of Patent: Sep. 20, 2016

(54) METHOD TO OPTIMIZE ALMOST BLANK SUBFRAME USAGE IN A WIRELESS NETWORK

(71) Applicant: Telefonica, S.A., Madrid (ES)

(72) Inventor: Luis Cucala Garcia, Madrid (ES)

(73) Assignee: Telefonica, S.A., Madrid (ES)

( * ) Notice: Subject to any disclaimer, the term of this patent is extended or adjusted under 35 U.S.C. 154(b) by 141 days.

(21) Appl. No.: 14/337,927

(22) Filed: Jul. 22, 2014

(65) Prior Publication Data

US 2015/0029907 A1   Jan. 29, 2015

(30) Foreign Application Priority Data

Jul. 23, 2013  (EP) .................................... 13382297

(51) Int. Cl.
*H04L 5/00* (2006.01)
*H04W 72/12* (2009.01)
*H04W 92/20* (2009.01)
*H04W 84/04* (2009.01)

(52) U.S. Cl.
CPC ........ *H04L 5/0073* (2013.01); *H04W 72/1278* (2013.01); *H04L 5/0094* (2013.01); *H04W 84/045* (2013.01); *H04W 92/20* (2013.01)

(58) Field of Classification Search
CPC ......... H04L 5/0073; H04L 5/00; H04L 5/14; H04L 5/0053; H04W 72/1278; H04W 84/045; H04W 92/20
See application file for complete search history.

(56) References Cited

U.S. PATENT DOCUMENTS

2013/0272274 A1* 10/2013 Ishida ................. H04W 72/082  
370/336  
2013/0286931 A1* 10/2013 Lee ................... H04W 72/0413  
370/315

* cited by examiner

*Primary Examiner* — Mohammad Anwar  
(74) *Attorney, Agent, or Firm* — Sughrue Mion, PLLC (57) ABSTRACT

A method to optimize almost blank subframe usage in a wireless network including generating, an interfering base station, in order to minimize interference caused to a serving base station, an almost blank subframe pattern and sending the latter to the serving base station. The serving base station generating a set of preferred almost blank subframes, from said received almost blank subframe pattern, that their knows will be of use for providing a wireless connectivity to a user terminal, and sending the preferred almost blank subframes ordered by a priority of usage to said interfering base station. And the interfering base station, using, in the case of requiring the use of additional subframes for serving its own user terminals, the almost blank subframes indicated as low priority in said received set of preferred almost blank subframes from the serving base station.

15 Claims, 9 Drawing Sheets

METHOD TO OPTIMIZE ALMOST BLANK SUBFRAME USAGE IN A WIRELESS NETWORK

CROSS REFERENCE TO RELATED APPLICATIONS

This is a U.S. Patent Application, claiming priority based on European Patent Application No. 13382297.3 filed Jul. 23, 2013, the content of all of which is incorporated herein by reference in its entirety.

FIELD OF THE ART

The present invention generally relates to wireless communication networks, and more particularly to a method to optimize almost blank subframe usage in a wireless network.

BACKGROUND OF THE INVENTION

In deployments of wireless mobile networks, and in particular in 3GPP's Long Term Evolution (LTE), a set of base stations or eNB's can make use of the same radio resources in the time and frequency domain, creating interference to terminals (UE's) located in the border coverage areas between them. This situation is particularly severe in the case of the so called heterogeneous networks, where a layer of high power macro eNB's is overlaid with layers of lower power eNB's that are deployed in the same area. Such deployments can achieve significantly improved overall capacity, although cell-edge performance can be degraded due to intra-carrier interference. Interference reduction in these scenarios is the object of techniques known as Inter Cell Interference Coordination (ICIC).

A procedure for interference reduction in wireless communications where the same radio resources are used in two different base stations is the so called Time Domain Multiplexing ICIC. In this approach the transmissions from an aggressor eNB inflicting interference onto other are periodically muted for entire subframes, so that the victim eNB have a chance to serve their UE's in these subframes. This muting is not complete, as certain signals like common reference symbols, synchronization signals or a broadcast channel have to be transmitted even in the muted subframes. Subframes that are muted are called almost blank subframes (ABS).

ABS muting patterns are configured semi-statically and signalled between eNB's through the X2 interface. Signalling is done by means of bit maps of length 40 or 70, representing the ABS pattern over four frames for FDD mode, and two to seven frames for TDD. The ABS pattern can be configured by the network in a static way, or it is possible to apply self-optimizing networks (SON) function for optimizing the muting pattern according to some target criterion like load balancing and taking into account the traffic in both the aggressor eNB and the victim eNB's.

Figure 1:
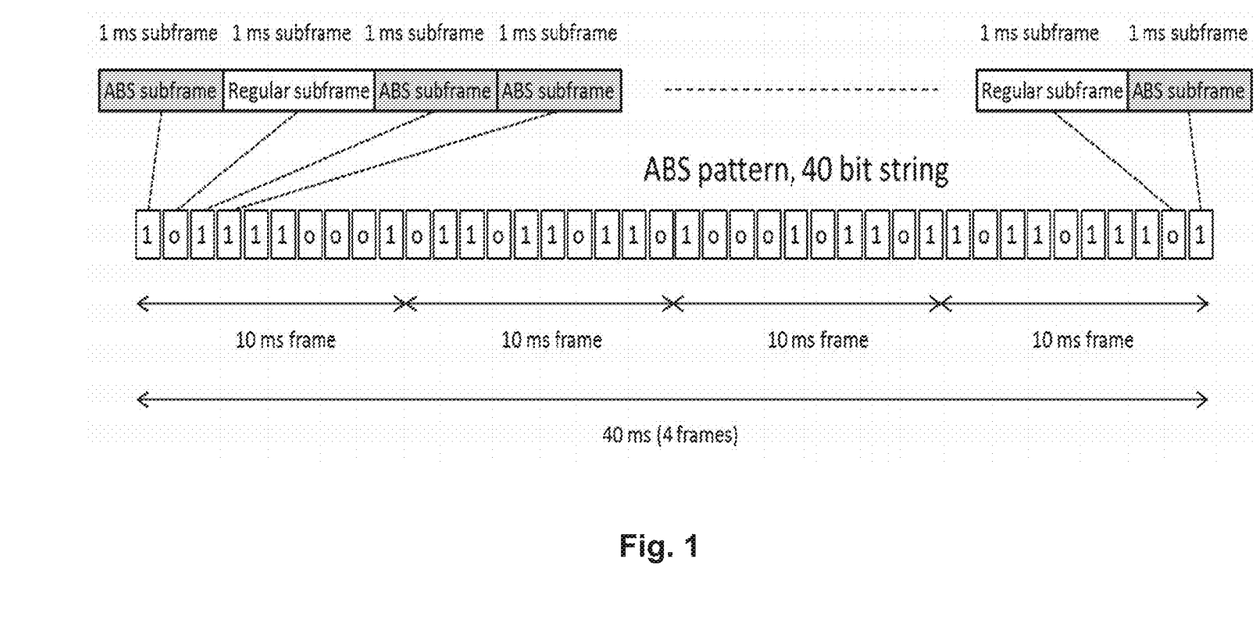
FIG. 1 is an example of an ABS pattern represented as a 40 bit string.

ABS muting pattern is communicated from the aggressor eNB to the victim eNB by means of an "ABS Information" Information Element (ABS Information IE), as it is described in [1]. The ABS Information IE includes the "ABS Pattern Info", which is a 40 bit string. This 40 bit string represents 40 subframes in 4 consecutive frames, the first bit representing the first subframe of the 40 subframes, and the last bit the last subframe of the 40 subframes. In this 40 bit string, a bit equal to 1 represents an ABS subframe, and a bit equal to 0 an ordinary non-ABS subframe. The ABS pattern starts in the System Frame Number 0, and is repeated continuously every 4 frames (40 ms). The System Frame Number is increased every 10 ms (every frame) and runs from System Frame Number 0 to System Frame Number 1023, therefore an ABS pattern remains active for at least 1024 frames, or 10.24 s. The aggressor eNB can send a new ABS Information IE to the victim eNB with a new ABS Pattern Info, which will come into effect when the System Frame Number is again 0. FIG. 1 shows an ABS pattern and its representation as a 40 bit string.

The ABS Information IE is part of the Load Information message, which is sent through the X2 interface, as it is described in [2][2]. The purpose of the Load Information message is to transfer load and interference co-ordination information between eNB's controlling intra-frequency neighbouring cells.

TABLE 1

| Load Information message | | |
|---|---|---|
| IE/Group Name | IE type and reference | Semantics description |
| Message Type | | |
| Cell Information | | |
| >Cell Information Item | | |
| >>Cell ID | | Identification of the source cell |
| >>UL Interference Overload Indication | | |
| >>UL High Interference Information | | |
| >>>Target Cell ID | | |
| >>>UL High Interference Indication | | |
| >>Relative Narrowband Tx Power (RNTP) | | |
| >>ABS Information | | Information Element that contains the ABS pattern information |
| >>Invoke Indication | | |

If the ABS Information IE is included in the Load Information message, the ABS Pattern Info IE indicates the subframes designated as almost blank subframes by the sending (aggressor) eNB for the purpose of interference coordination. The receiving (victim) eNB may take such information into consideration when scheduling UE's. The structure of the ABS Information IE is as follows.

TABLE 2

| ABS Information IE | | |
|---|---|---|
| IE/Group Name | IE type and reference | Semantics description |
| ABS Information | — | — |
| >FDD | — | — |
| >>ABS Pattern Info | BIT STRING (SIZE(40)) | Each position in the bitmap represents a DL subframe, for which value "1" indicates 'ABS' and value "0" indicates 'non ABS'. The first position of the ABS pattern corresponds to subframe 0 in a |

TABLE 2-continued

ABS Information IE

| IE/Group Name | IE type and reference | Semantics description |
|---|---|---|
| | | radio frame where SFN = 0. The ABS pattern is continuously repeated in all radio frames. The maximum number of subframes is 40. |
| >>Number Of Cell-specific Antenna Ports | ENUMERATED (1, 2, 4, ...) | P (number of antenna ports for cell-specific reference signals) defined in TS 36.211 [10] |
| >>Measurement Subset | BIT STRING (SIZE(40)) | Indicates a subset of the ABS Pattern Info above, and is used to configure specific measurements towards the UE. |
| >TDD | — | — |
| >>ABS Pattern Info | BIT STRING (1 ... 70, ...) | Each position in the bitmap represents a DL subframe for which value "1" indicates 'ABS' and value "0" indicates 'non ABS'. The maximum number of subframes depends on UL/DL subframe configuration. The maximum number of subframes is 20 for UL/DL subframe configuration 1~5; 60 for UL/DL subframe configuration 6; 70 for UL/DL subframe configuration 0. UL/DL subframe configuration defined in [3] The first position of the ABS pattern corresponds to subframe 0 in a radio frame where SFN = 0. The ABS pattern is continuously repeated in all radio frames, and restarted each time SFN = 0. |
| >>Number Of Cell-specific Antenna Ports | ENUMERATED (1, 2, 4, ...) | P (number of antenna ports for cell-specific reference signals) defined in TS 36.211 [10] |
| >>Measurement Subset | BIT STRING (1 ... 70, ...) | Indicates a subset of the ABS Pattern Info above, and is used to configure specific measurements towards the UE |
| >ABS Inactive | NULL | Indicates that interference coordination by means of almost blank sub frames is not active |

If the Invoke Indication IE is included in the Load Information message, it indicates which type of information the sending eNB would like the receiving eNB to send back. If the sending eNB is the victim eNB, the victim eNB can make use of the Invoke Indication IE to request the activation of ABS subframes in the aggressor eNB. In this case the Invoke Indication IE is set to "ABS Information", and it indicates that the sending (victim) eNB would like the receiving (aggressor) eNB to initiate the Load Indication message, with the Load Information message containing the ABS Information IE indicating the ABS pattern.

On the other hand, the aggressor eNB can request to the victim eNB to report the status of the ABS subframes usage at the victim eNB by means of a Resource Status Request message on the X2 interface. The victim eNB will report back by means of the Resource Status Update message [4], which includes the ABS Status IE. The ABS Status IE is used to aid the aggressor eNB which is creating the ABS pattern to evaluate the need for modification of the ABS pattern. The ABS Status IE is defined in [5] and indicates a percentage of used ABS resources in the victim eNB.

The standard procedure for reporting the status of radio resources usage between eNB's through the X2 interface is as follows. The process starts by means of a Resource Status Request message [6], which is sent by an eNB to a neighbouring eNB to initiate the requested measurement according to the parameters given in the message, and the neighbouring eNB answers with a Resource Status Response message, which is sent to indicate that the requested measurement, for all or for a subset of the measurement objects included in the measurement is successfully initiated. Then, the neighbouring eNB will send Resource Status Update messages to report the results of the requested measurements [4][4].

The contents of the Resource Status Request message, where eNB1 is the sending eNB and eNB2 the neighbouring eNB, as is showed in table 3.

TABLE 3

Resource Status Request message

| IE/Group Name | IE type and reference | Semantics description |
|---|---|---|
| Message Type | | |
| eNB1 Measurement ID | INTEGER (1 ... 4095, ...) | Allocated by eNB$_1$ |
| eNB2 Measurement ID | INTEGER (1 ... 4095, ...) | Allocated by eNB$_2$ |
| Registration Request | ENUMERATED(start, stop, ...) | A value set to "stop", indicates a request to stop all cells measurements. |
| Report Characteristics | BITSTRING (SIZE(32)) | Each position in the bitmap indicates measurement object the eNB$_2$ is requested to report. First Bit = PRB Periodic, Second Bit = TNL load Ind Periodic, Third Bit = HW Load Ind Periodic, Fourth Bit = Composite Available Capacity Periodic, |

TABLE 3-continued

Resource Status Request message

| IE/Group Name | IE type and reference | Semantics description |
|---|---|---|
| | | Fifth Bit = ABS Status Periodic. Other bits shall be ignored by the $eNB_2$ |
| Cell To Report >Cell To Report Item | | Cell ID list for which measurement is needed |
| >>Cell ID | | ECGI |
| Reporting Periodicity | ENUMERATED(1000 ms, 2000 ms, 5000 ms, 10000 ms, . . . ) | |
| Partial Success Indicator | ENUMERATED(partial success allowed, . . . ) | Included if partial success is allowed. |

Regarding the contents of the Resource Status Response message, it is showed in Table 4.

TABLE 4

Resource Status Response message

| IE/Group Name | IE type and reference | Semantics description |
|---|---|---|
| Message Type | | |
| eNB1 Measurement ID | INTEGER (1 . . . 4095, . . . ) | Allocated by $eNB_1$ |
| eNB2 Measurement ID | INTEGER (1 . . . 4095, . . . ) | Allocated by $eNB_2$ |
| Cell Measurement Result >Cell Measurement Result Item | | |
| >>Cell ID | | ECGI |
| >>Hardware Load Indicator | | |
| >>S1 TNL Load Indicator | | |
| >>Radio Resource Status | | |
| >>Composite Available Capacity Group | | |
| >>ABS Status | | |

A problem with the existing solutions is that in the current ABS implementation, the aggressor eNB commits to not using the ABS subframes that it has reported in the ABS Information IE as ABS subframes until a new ABS Information IE is sent and a new ABS pattern starts at System Frame Number o. Therefore, a given amount of radio resources at the aggressor eNB are reserved for ABS subframes for a period of 10.24 seconds and the aggressor eNB will not use them although it could require serving traffic higher than expected. The result of the current ABS implementation is that an aggressor eNB could require serving a peak traffic demand and not having any radio resources available, although some of the subframes labelled as ABS subframe perhaps are not used by the victim eNB, thus making an inefficient use of the radio interface.

Figure 2:
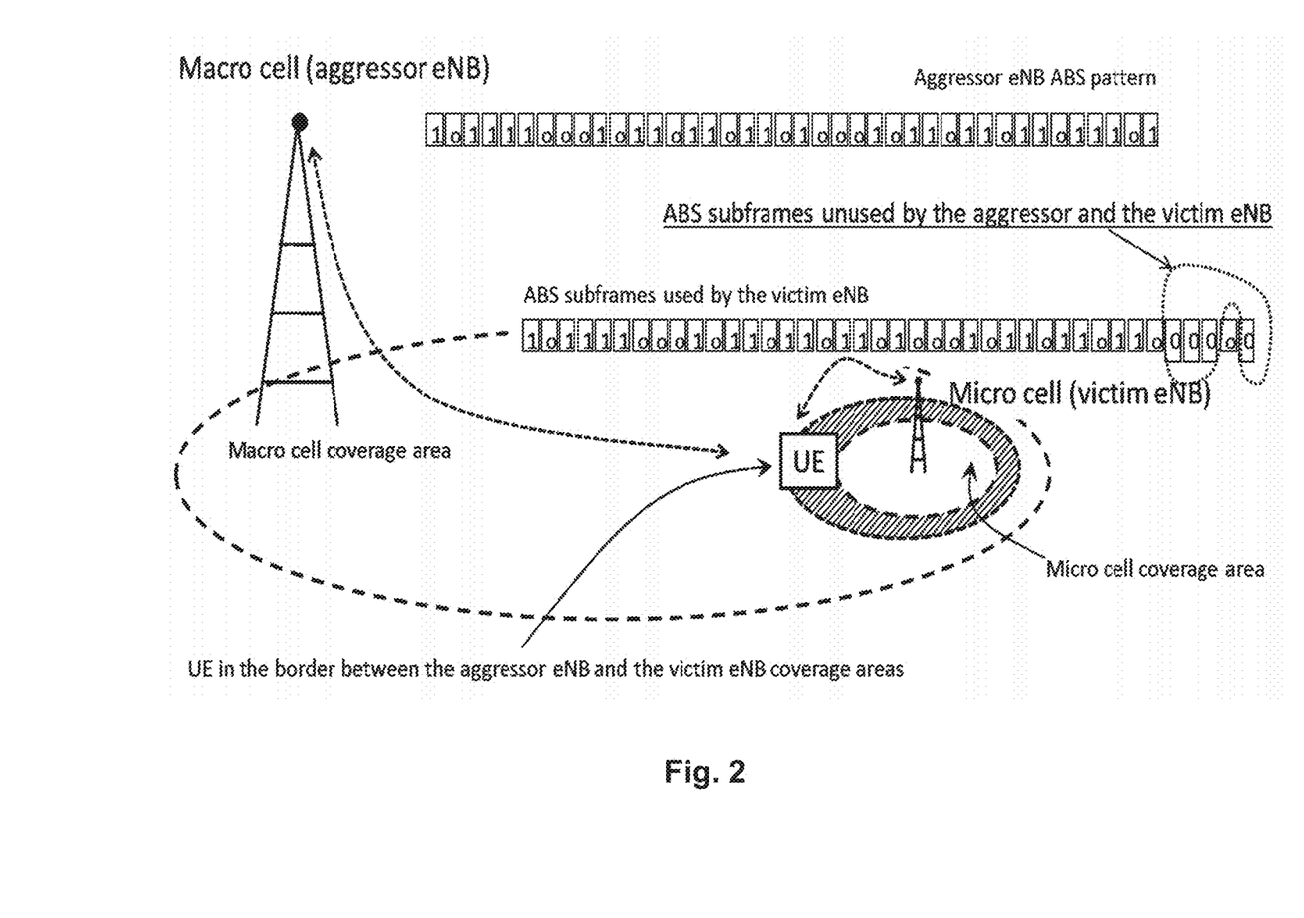
FIG. 2 is an illustration of a situation where some ABS subframes remain unused by both the interfering base station or aggressor eNB and the serving base station or victim eNB.

Another related disadvantage of the current ABS solution is that it limits the flexibility of the ABS subframes to distribute the traffic load between the aggressor eNB and the victim eNB, because if the aggressor eNB seeks to implement a high traffic load diversion to the victim eNB, by means of reserving many subframes to the ABS pattern, it runs the risk of not being able to support unexpected data traffic demands in the aggressor eNB. FIG. 2 represents the situation where some ABS subframes remain unused by both the aggressor eNB and the victim eNB.

On the other hand, the ABS Status IE only reports a percentage of the ABS subframes used by a victim eNB in the past, but does not include an indication of the expected ABS subframes to be used in the future and its related probability.

Figure 3:
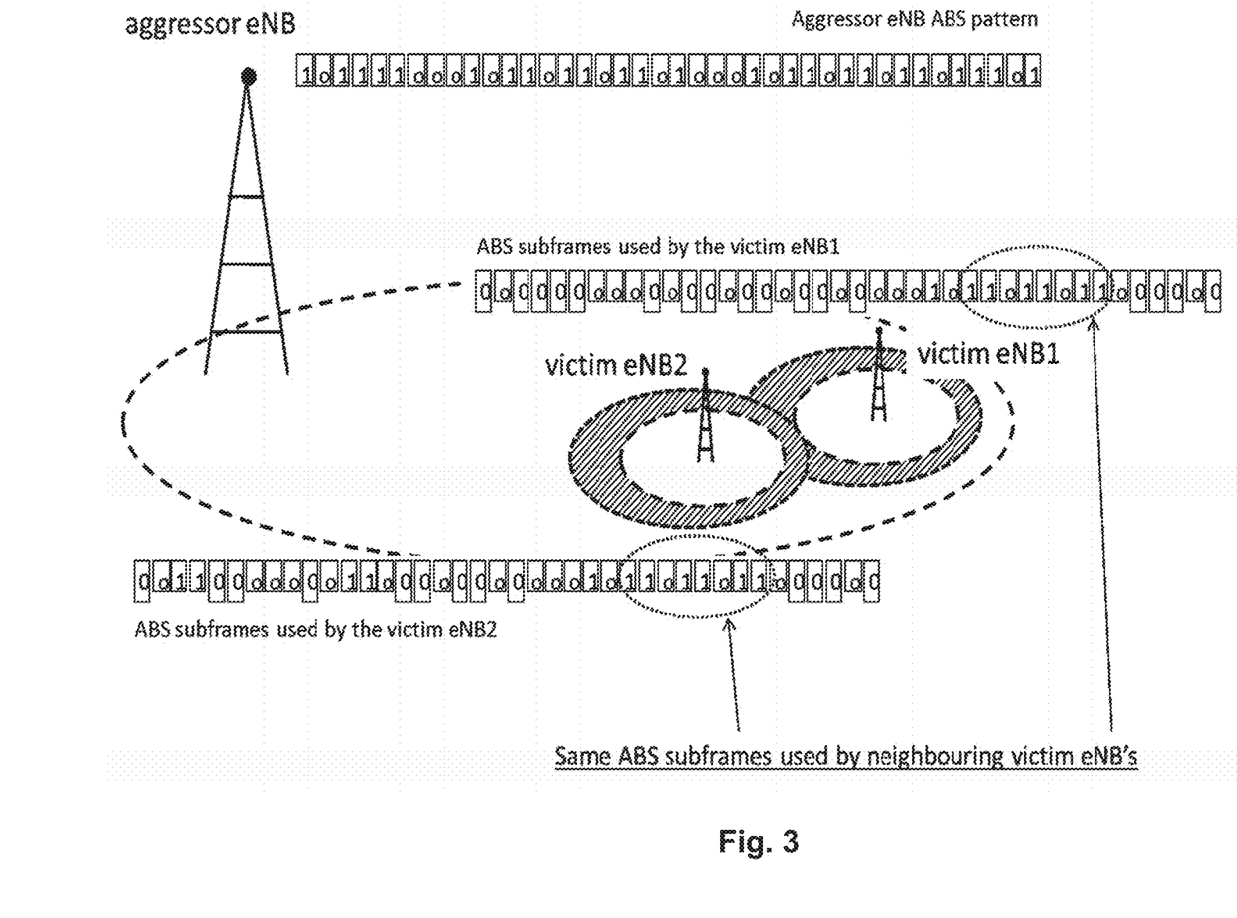
FIG. 3 is an illustration of a situation where same ABS subframes are used by two neighbouring victim eNB's and thus potentially producing interference to each other.

Another problem of the current ABS implementation is that it is not efficient when two or more victim eNB's are interfered by the aggressor eNB. The aggressor eNB will define a single ABS pattern, and every victim eNB will make use of the ABS subframes without coordination of the ABS subframes selected by the other victim eNB's. As a result, two neighbouring victim eNB's can select the same ABS subframes for serving their own UE's, causing interfering to each other. FIG. 3 represents the situation where some ABS subframes are used by two neighbouring victim eNB's and thus potentially producing interference to each other.

Figure 4:
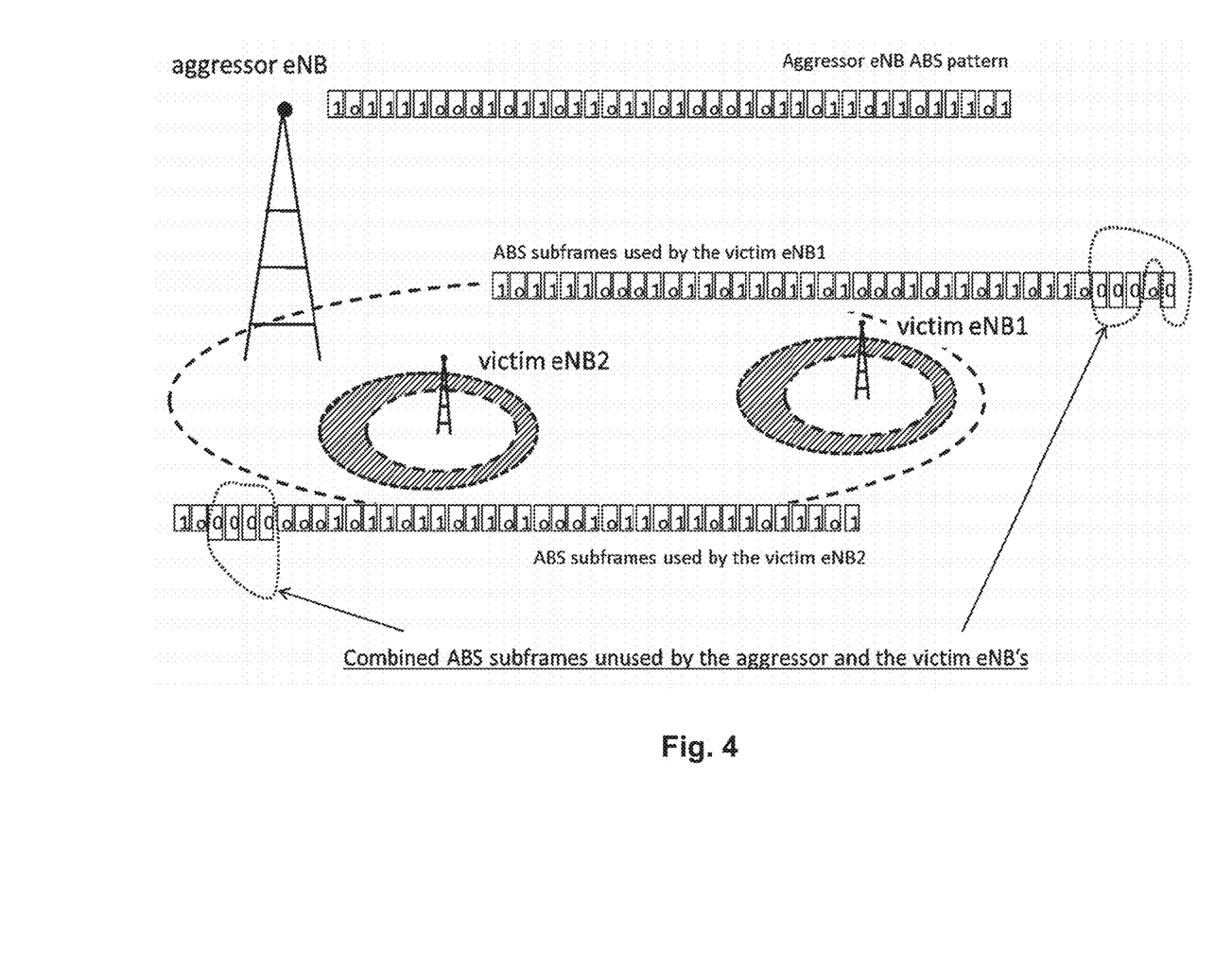
FIG. 4 is an illustration of a situation where different ABS subframes are used by two neighbouring victim eNB's when they could use the same ones because they are not interfering each other.

On the other hand, two non-neighbouring victim eNB's can select different ABS subframes, when they could select the same ABS subframes without interfering each other and thus leaving more possibly unused ABS subframes for the aggressor eNB usage, as it is represented in FIG. 4.

REFERENCES

[1] 3GPP TS 36.423 "3rd Generation Partnership Project; Technical Specification Group Radio Access Network; Evolved Universal Terrestrial Radio Access Network (E-UTRAN); X2 application protocol (X2AP)". Section 9.2.54 ABS Information

[2] 3GPP TS 36.423 "3rd Generation Partnership Project; Technical Specification Group Radio Access Network; Evolved Universal Terrestrial Radio Access Network (E-UTRAN); X2 application protocol (X2AP)". Section 8.3.1 Load Indication

[3] 3GPP TS 36.211 "3rd Generation Partnership Project; Technical Specification Group Radio Access Network; Evolved Universal Terrestrial Radio Access (E-UTRA); Physical Channels and Modulation Section 4.2 Frame structure type 2.

[4] 3GPP TS 36.423 "3rd Generation Partnership Project; Technical Specification Group Radio Access Network; Evolved Universal Terrestrial Radio Access Network (E-UTRAN); X2 application protocol (X2AP)". Section 9.1.2.14 Resource Status Update.

[5] 3GPP TS 36.423 "3rd Generation Partnership Project; Technical Specification Group Radio Access Network; Evolved Universal Terrestrial Radio Access Network (E-UTRAN); X2 application protocol (X2AP)". Section 9.2.58 ABS Status.

[6] 3GPP TS 36.423 "3rd Generation Partnership Project; Technical Specification Group Radio Access Network; Evolved Universal Terrestrial Radio Access Network (E-UTRAN); X2 application protocol (X2AP)". Section 9.1.2.11 Resource Status Request.

SUMMARY OF THE INVENTION

A goal of this invention is to optimize ABS subframe usage in a scenario where an interfering base station or aggressor eNB implements an ABS pattern to minimize interference into user terminals or UE's served by a serving base station or victim eNB, enabling the interfering base station to use some ABS-marked subframes if the probability of the serving base station using those subframes is low.

To that end, the present invention provides a method to optimize almost blank subframe usage in a wireless network, wherein at least one serving base station, for instance a microcell, provides wireless connectivity to at least one user terminal, said at least one user terminal suffering interference from at least one interfering base station, for instance a macrocell. In the method the at least one interfering base station generates, in order to minimize said interference, an almost blank subframe pattern that the at least one interfering base station knows will not be needed, and sends it to the at least one serving base station.

On contrary of the known proposals, in the proposed method the at least one serving base station a) generates a set of preferred almost blank subframes, or ABS preferred list as will be termed in some parts of this description, from the received almost blank subframe pattern, that the at least one serving base station knows will be of use for providing said wireless connectivity, and b) sends the set of preferred almost blank subframes, ordered by a priority of usage, to the at least one interfering base station. Then, the at least one interfering base station uses, in the case of requiring the use of additional subframes for serving its own user terminals, the almost blank subframes indicated as low priority in said received set of preferred almost blank subframes from the at least one serving base station.

The sending of the set of preferred almost blank subframes is performed before a new almost blank subframe pattern is generated by said at least one interfering base station. Generally, the period of time between said sending and the generation of said new almost blank subframe pattern will be less than 10.24 seconds.

In an embodiment, the interfering base station, previous to said step a), further sends to said serving base station a Resource Status Request message including in the Report Characteristics bit string an additional bit indicating which signals to said serving base station to send said set of preferred almost blank subframes.

The set of preferred almost blank subframes can be generated autonomously by the serving base station or alternatively, in response to an indication or ABS suggested list received from the interfering base station, said indication starting which subframes of the almost blank subframe pattern to be used by said serving base station with a higher priority.

In case a plurality of serving base stations are interfered by the interfering base station and the plurality of serving base stations do not overlap with each other, the interfering base station can provide the same indication to all of said plurality of interfered serving base stations. Therefore when said interfering base station performing said step b) the probability of said interfering base station using a subframe used by any serving station of said plurality of serving base stations will be low.

In case a plurality of serving base stations are interfered by the interfering base station and the plurality of serving base stations overlap between them, the interfering base station can provide different indications to each serving base station. Therefore the probability of any serving base station using a subframe used by any other serving station of said plurality of serving base stations will be low.

The indication or indications preferably will be sent as part of the Resource Status Request message.

The set of preferred almost blank subframes and/or said indication or indications generally will include a string of integers, having a maximum length of 40 integers for a FDD mode or of 70 integers for a TDD mode, representing every integer a subframe position in said almost blank subframe pattern of said interfering base station, ordered said string of integers from left for the highest priority subframe of said almost blank subframe to right for the lowest priority subframe of said almost blank subframe.

The set of preferred almost blank subframes can have the same length or alternatively, a shorter length of the almost blank subframe pattern.

The subframes of the almost blank subframe pattern not included in said set of preferred almost blank subframes, preferably, will have the same priority, being said priority lower than the lowest priority included in the set of preferred almost blank subframes.

With the proposed method, the invention enables the interfering base station to use those ABS subframes that are expected to be used with a low probability by the serving/s base station/s, in the case the interfering base station needs extra radio resources to support its own traffic without needing to send a new ABS Information IE and waiting for the new ABS pattern come into force at System Frame Number 0. The result is a higher efficiency in the use of the radio resources, enabling the occasional use of some ABS subframes that otherwise could remain unused by both the serving base station and the interfering base station.

A related advantage of the invention is that it increases the flexibility of the ABS subframes to distribute the traffic load between the interfering base station and the serving base station, because the interfering base station can implement a high traffic load diversion to the serving base station, by means of reserving many subframes to the ABS pattern, and at the same time being able to support unexpected data traffic demands in the interfering base station.

Another advantage of the invention is that it can coordinate the ABS pattern usage between different serving base stations' that are potentially interfered by the interfering base station. In the case of two neighbouring serving base stations', the invention can help in the selection of different ABS subframes in every serving base station, reducing the interference between them. In the case of two non-neighbouring serving base stations', the invention can help in the selection of the same ABS subframes, without interfering each other and thus leaving possible unused ABS subframes for the interfering base station usage.

BRIEF DESCRIPTION OF THE DRAWINGS

The previous and other advantages and features will be more fully understood from the following detailed description of embodiments, with reference to the attached, which must be considered in an illustrative and non-limiting manner, in which.

DETAILED DESCRIPTION OF SEVERAL EMBODIMENTS

In reference to an scenario similar to the one illustrated in FIG. 2, when only one serving base station or victim eNB is under the coverage area of an interfering base station or aggressor eNB, which is the simplest embodiment of this invention, the aggressor eNB reports its ABS pattern making use of a Load Information Message. The victim eNB receives the ABS pattern and decides an ordered list of preferred ABS subframes that it will use for serving UE's in the overlap coverage area between the aggressor eNB and the victim eNB.

Preferably, the order list of preferred ABS subframes is a list of integers, whose values range from 0 to n, where 0 corresponds to the first subframe in the ABS pattern and n to the last subframe, being n equal to 39 in the case of the FDD mode, and up to 69 in the case of the TDD mode. The first integer in the list is the highest priority subframe for ABS usage in the victim eNB, and the last integer is the lowest priority one. The length of the list can range from 0, when the victim eNB does not expect to use any ABS subframe, to 40 or 70, when the victim eNB expects to use all the possible ABS subframes. The length of the list is an indication of the percentage of ABS subframes the victim eNB expects to use.

Then, the victim eNB will report to the aggressor eNB, by means of an IE through the X2 interface, the list of its preferred ABS subframes. In the case the aggressor eNB requires more radio resources than those not marked as ABS subframes, it can make use of the ABS subframes marked by the victim eNB as with the lowest priority, or if the length of the reported list by the victim eNB is shorter than 40, the ABS subframes not included in the list, and then the probability of interfering to the UE's served by the victim eNB will be minimized.

In reference now to a more complex embodiment of this invention, when two or more victim eNB's are under the coverage area of an aggressor eNB, for instance the scenario illustrated in FIG. 3 or 4, the aggressor eNB reports its ABS pattern and also indicates a suggested subset of the ABS pattern to every victim eNB. The suggested subset is an ordered list of integers, which are part of the ABS pattern, whose values range from 0 to n, where 0 corresponds to the first subframe in the ABS pattern and n to the last subframe, being n equal to 39 in the case of the FDD mode, and up to 69 in the case of the TDD mode. The first integer in the suggested list is the suggested highest priority subframe for ABS usage in the victim eNB, and the last integer is the suggested lowest priority one. The length of the list can range from 0, when the aggressor eNB suggests not using any ABS subframe, to 40 or 70, when the aggressor eNB suggest using all the possible ABS subframes.

Figure 5:
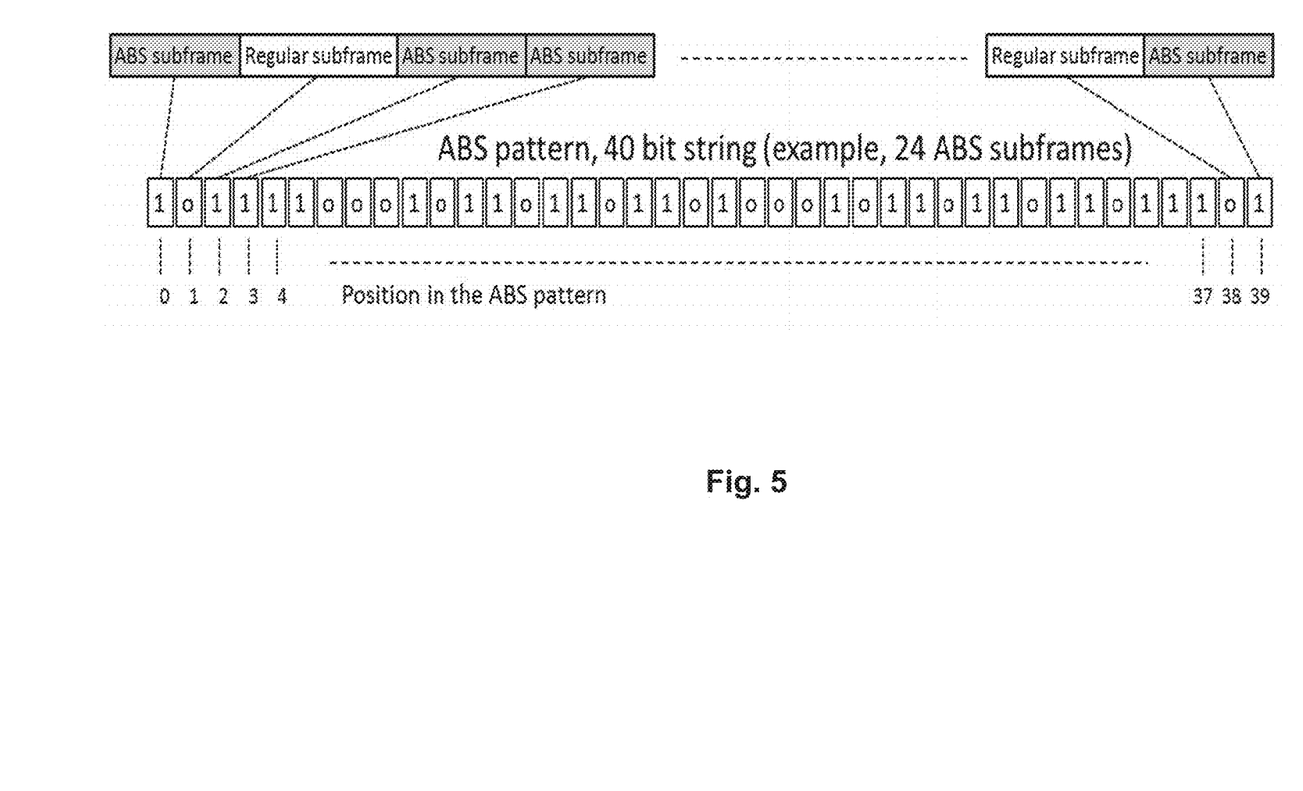
FIG. 5 is an example of an ABS Pattern and position of every ABS subframe for a TDD mode that can be used by the proposed method according to an embodiment.

The ABS pattern, as it is announced by the aggressor eNB in the ABS Information IE, is a bit string of length $N_{ABSPATTERN}$ of up to 40 bits in the case of the FDD mode, or up to 70 bits in the case of the TDD mode, where a 1 represents an ABS subframe and a 0 a non-ABS subframe. The position Of very bit in this bit string can be represented from "position 0" for the leftmost bit, to "position 39" for the last bit in the pattern in the case of the FDD mode, or up to "position 69" in the case of the TDD mode. FIG. 5 is an example for the TDD mode.

In one embodiment of this invention, the Resource Status Request message, which is sent by the aggressor eNB to the victim eNB, includes an additional sixth bit in the Report Characteristics bit string, called "ABS Preferred List". When the ABS Preferred List is set to 1 in the Resource Status Request message, it indicates to the receiving (victim) eNB that the sending (aggressor) eNB requests to the receiving (victim) eNB to send a list of the ABS subframes it will prefer to use. Table 5 shows the updated Resource Status Request message.

TABLE 5

Resource Status Request message including a 6th bit in the Report Characteristics for requiring the ABS Preferred List

| IE/Group Name | IE type and reference | Semantics description |
|---|---|---|
| Message Type | | |
| eNB1 Measurement ID | INTEGER (1 . . . 4095, . . . ) | Allocated by eNB$_1$ |
| eNB2 Measurement ID | INTEGER (1 . . . 4095, . . . ) | Allocated by eNB$_2$ |
| Registration Request | ENUMERATED(start, stop, . . . ) | A value set to "stop", indicates a request to stop all cells measurements. |
| Report Characteristics | BITSTRING (SIZE(32)) | Each position in the bitmap indicates measurement object the eNB$_2$ is requested to report. |

TABLE 5-continued

Resource Status Request message including a 6th bit in the Report Characteristics for requiring the ABS Preferred List

| IE/Group Name | IE type and reference | Semantics description |
|---|---|---|
| | | First Bit = PRB Periodic, Second Bit = TNL load Ind Periodic, Third Bit = HW Load Ind Periodic, Fourth Bit = Composite Available Capacity Periodic, Fifth Bit = ABS Status Periodic. Sixth Bit = ABS Preferred List Other bits shall be ignored by the eNB$_2$ |
| Cell To Report >Cell To Report Item | | Cell ID list for which measurement is needed |
| >>Cell ID | | ECGI |
| Reporting Periodicity | ENUMERATED(1000 ms, 2000 ms, 5000 ms, 10000 ms, . . . ) | |
| Partial Success Indicator | ENUMERATED(partial success allowed, . . . ) | Included if partial success is allowed. |

The ABS Preferred List preferably will be a subset of the ABS pattern announced by the sending (interfering or aggressor) eNB, and therefore its length $N_{PREFERRED}$ will range from 0 integers, when the victim eNB does not select any preferred ABS subframes, to 40 integers in the case of the FDD mode or 70 integers in the case of the TDD mode, when the victim eNB selects all the ABS subframes of an ABS pattern of length equal to 40 (FDD mode) or 70 (TDD mode). The integers in the ABS Preferred List are ordered, representing the leftmost integer the ABS subframe that the victim eNB expects to use with a highest priority and the rightmost integer the ABS subframe that the victim eNB expects to use with a lowest priority. If the length of the ABS Preferred List is shorter than the length of the ABS pattern, $N_{PREFERRED} < N_{ABSPATTERN}$, all the ABS subframes not included in the ABS Preferred list will be considered to have the same priority, and that priority lower than the rightmost integer in the ABS Preferred List.

Figure 6:
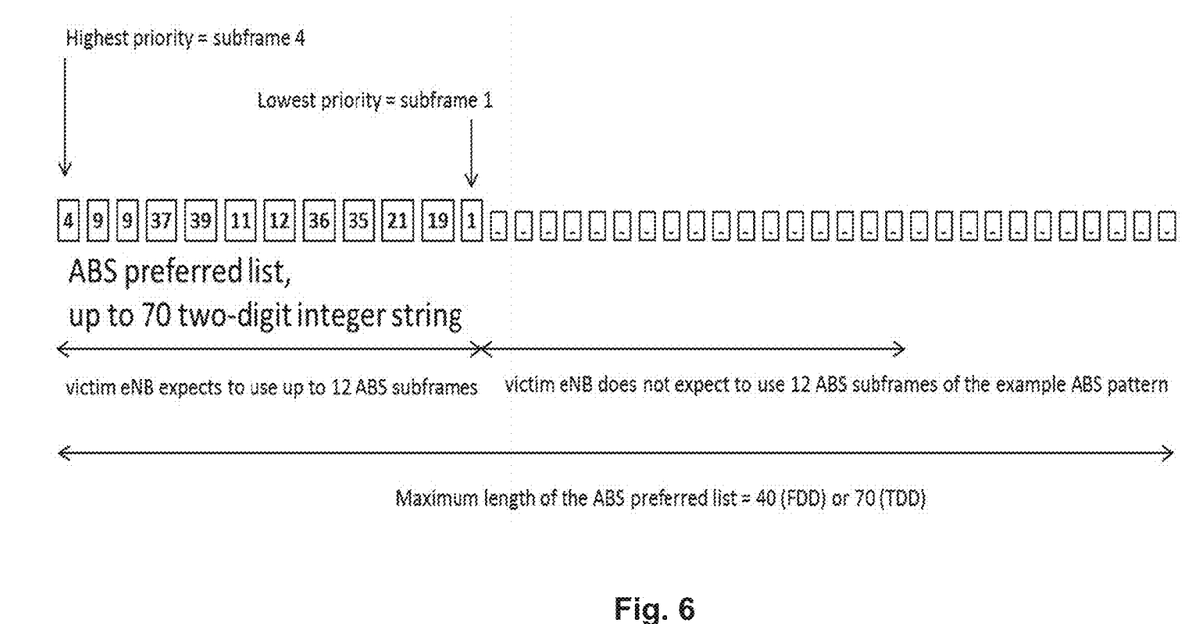
FIG. 6 is an example of a set of preferred almost blank subframes or ABS preferred list generated by the aggressor eNB according to an embodiment of the invention.

FIG. 6 shows an example of an ABS Preferred List for the case of the FDD mode. In this example, the length of the ABS Preferred List is 12, and it indicates that the highest priority ABS subframe is the ABS subframe 4, the next priority ABS subframe is the ABS subframe 9, etc., and the lowest ABS subframe is the ABS subframe 1. In this example, the length of the ABS pattern is 24, and therefore the victim eNB does not expect to use 12 ABS subframes of the ABS pattern, and this 12 ABS subframes will have a lower priority than the ABS subframe 1.

As a result of a Resource Status Request message sent from the aggressor eNB to the victim eNB, which includes the ABS Preferred List bit, the victim eNB will report to the aggressor eNB its ABS Preferred List by means of a Resource Status Response message that will include the ABS Preferred List.

TABLE 6

Resource Status Response message including the ABS Preferred List

| IE/Group Name | IE type and reference | Semantics description |
|---|---|---|
| Message Type | | |
| eNB1 Measurement ID | INTEGER (1 . . . 4095, . . . ) | Allocated by eNB$_1$ |
| eNB2 Measurement ID | INTEGER (1 . . . 4095, . . . ) | Allocated by eNB$_2$ |
| Cell Measurement Result >Cell Measurement Result Item | | |
| >>Cell ID | | ECGI |
| >>Hardware Load Indicator | | |
| >>S1 TNL Load Indicator | | |
| >>Radio Resource Status | | |
| >>Composite Available Capacity Group | | |
| >>ABS Status | | |
| >>ABS Preferred List | INTEGER STRING (MAXIMUM SIZE (70)) | Ordered list of integers, every integer representing a subframe in the ABS pattern, the leftmost integer representing the highest priority ABS subframe |

Figure 7:
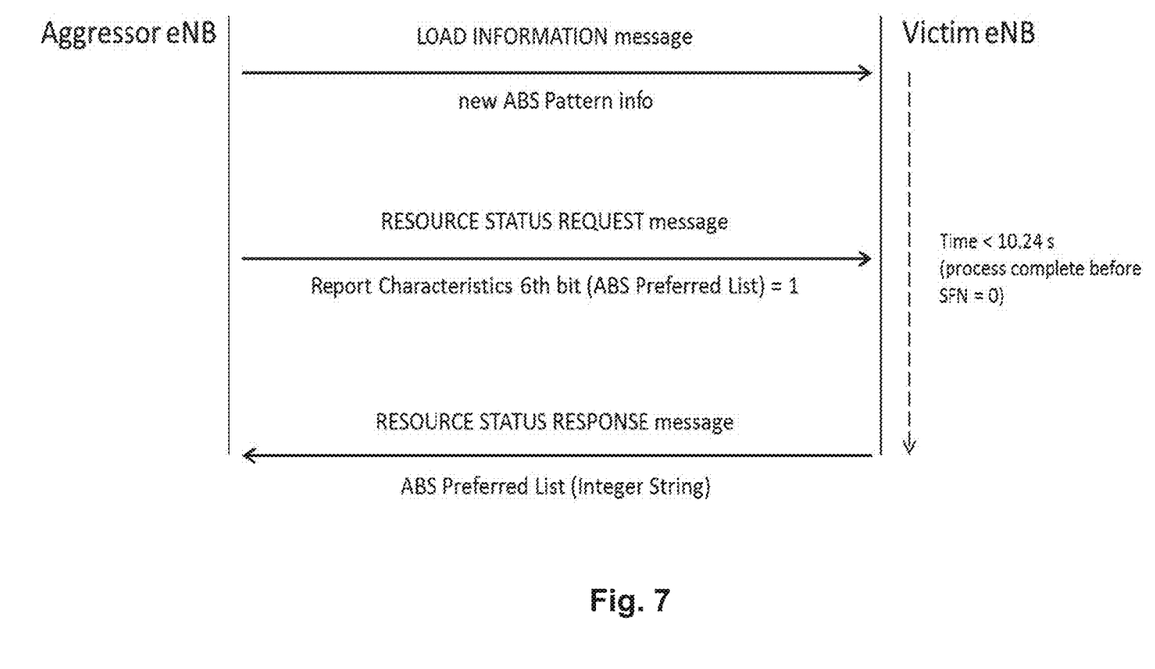
FIG. 7 is a flowchart illustrating the communication process between an aggressor eNB and a victim eNB when the victim eNB selects autonomously its ABS Preferred List according to an embodiment of the invention.

In reference now to FIG. 7, it is described the communication process between the aggressor eNB and the victim eNB according to the embodiment in which the victim eNB selects autonomously its ABS Preferred List, without any indication from the aggressor eNB. The ABS Preferred List will be then an ordered list of preferred ABS subframes that it will use for serving UE's in the overlap coverage area between the aggressor eNB and the victim eNB, and the procedure to determine when a UE is in the border area between the aggressor eNB and the victim eNB is out of the scope of this invention.

The process starts when the aggressor eNB sends a Load Information message with new ABS Pattern information, which will become effective when the System Frame Number is equal to 0. Then, the aggressor eNB sends a Resource Status Request message to the victim eNB setting the Reporting Characteristics $6^{th}$ bit to 1 in order to request to the victim eNB to send its ABS Preferred List. Finally, the victim eNB responds with a Resource Status Response message that includes the ABS Preferred List. The full process must be complete before the new ABS pattern comes into force when SFN=0, in order to allow the aggressor eNB to know the victim eNB's ABS Preferred List and the possibility to use some of the lowest priority ABS subframes.

Figure 9:
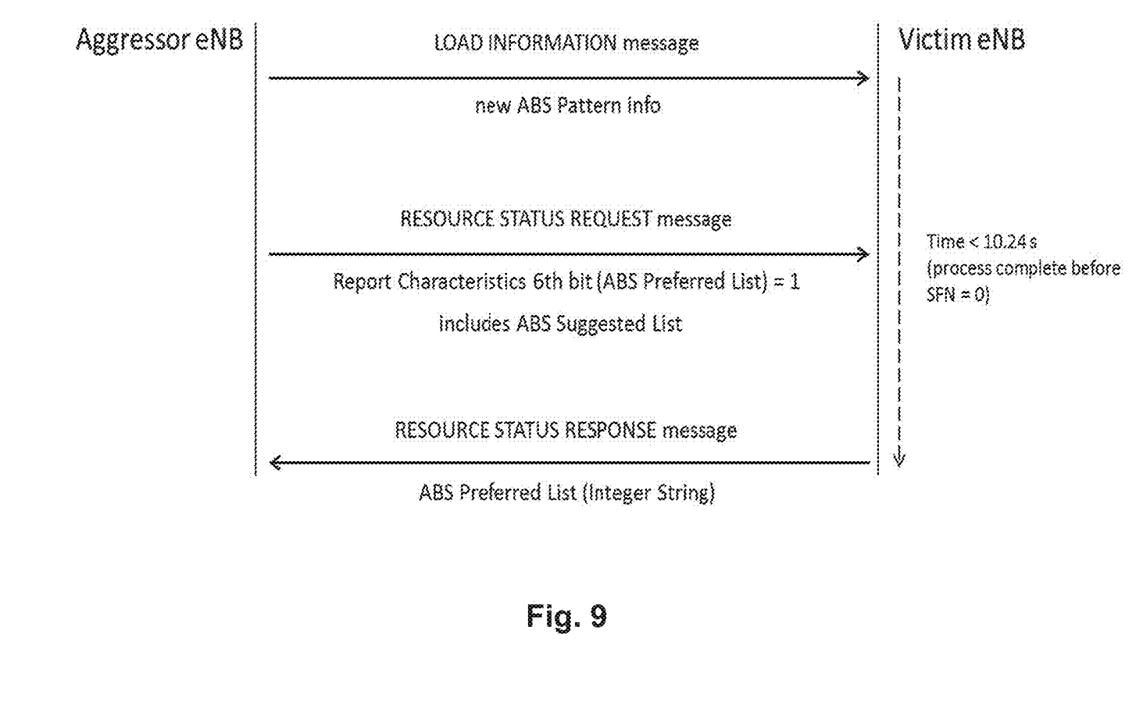
FIG. 9 is a flowchart illustrating the communication process between the aggressor eNB and the victim eNB when the aggressor eNB indicates an ABS Suggested List according to an embodiment of the invention.

In reference to FIG. 9, it is described the communication process between the aggressor eNB and the victim eNB according to the embodiment when the aggressor eNB provides to the victim eNB an indication of ABS subframes to be used with a higher priority, the ABS Suggested List. In the case there are many victim eNB's that can be interfered by the aggressor eNB, it will provide an ABS Suggested List to every possible victim eNB, and the ABS Suggested List can be different to every victim eNB, or it can be the same for some victim eNB's. The ABS Suggested List is a subset of the ABS Pattern, as it is reported by the ABS Pattern Info IE in the Load Information message. In case the victim eNB's coverage areas overlap between them, the aggressor eNB can provide different ABS Suggested lists to every victim eNB, and therefore if the victim eNB's use their ABS Suggested List, they will not interfere each other. Alternatively, if the victim eNB's coverage areas do overlap between them, the aggressor eNB provides the same ABS Suggested List to all the victim eNB's, and therefore if the victim eNB's use the ABS Suggested List, they will use the same subframes and the lower priority frames will be available for the aggressor eNB to use them with a low priority of interfering with the victim eNB's.

In an embodiment the ABS Suggested List IE is part of the Resource Status Request message. If the Resource Status Request message sets its Report Characteristics sixth bit equal to 1, meaning that it is requesting to the victim eNB to report its ABS Preferred List, and if the Resource Status Request message is also including the ABS Suggested List, the victim eNB can take into account the ABS Suggested List to generate its ABS Preferred List, in the sense that the ABS Preferred List will be a subset of the ABS Suggested List, and the ABS Preferred List will follow the same subframe priority order than in the ABS Suggested List. The aggressor eNB can send specific ABS Suggested lists to every victim eNB, by means of specific Resource Status Request messages that specify the Cell ID of the receiving victim eNB and include the ABS Suggested List for that victim eNB. The information of the Resource Status Request message, which includes the ABS Suggested List, is detailed in Table 7.

TABLE 7

Resource Status Request message including the ABS Suggested List

| IE/Group Name | IE type and reference | Semantics description |
|---|---|---|
| Message Type | | |
| eNB1 Measurement ID | INTEGER (1 . . . 4095, . . . ) | Allocated by $eNB_1$ |
| eNB2 Measurement ID | INTEGER (1 . . . 4095, . . . ) | Allocated by $eNB_2$ |
| Registration Request | ENUMERATED(start, stop, . . . ) | A value set to "stop", indicates a request to stop all cells measurements. |
| Report Characteristics | BITSTRING (SIZE(32)) | Each position in the bitmap indicates measurement object the $eNB_2$ is requested to report.<br>First Bit = PRB Periodic,<br>Second Bit = TNL load Ind Periodic,<br>Third Bit = HW Load Ind Periodic,<br>Fourth Bit = Composite Available Capacity Periodic,<br>Fifth Bit = ABS Status Periodic.<br>Sixth Bit = ABS Preferred List<br>Other bits shall be ignored by the $eNB_2$ |
| ABS Suggested List | INTEGER STRING (MAXIMUM SIZE (70)) | Ordered list of integers, every integer representing a subframe in the ABS pattern, the leftmost integer representing the highest priority ABS subframe |
| Cell To Report >Cell To Report Item >>Cell ID | ECGI | Cell ID list for which measurement is needed |
| Reporting Periodicity | ENUMERATED(1000 ms, 2000 ms, 5000 ms, 10000 ms, . . . ) | |
| Partial Success Indicator | ENUMERATED(partial success allowed, . . . ) | Included if partial success is allowed. |

The ABS Suggested List is a subset of the ABS pattern announced by the sending (aggressor) eNB, and therefore its length $N_{SUGGESTED}$ will range from 0 integers, when the sending (aggressor) eNB does not indicate any suggested ABS subframes to the victim eNB, to 40 integers in the case of the FDD mode or 70 integers in the case of the TDD mode. The integers in the ABS Suggested List are ordered, representing the leftmost integer the ABS subframe that the victim eNB should use with a highest priority and the rightmost integer the ABS subframe that the victim eNB should use with a lowest priority.

Figure 8:
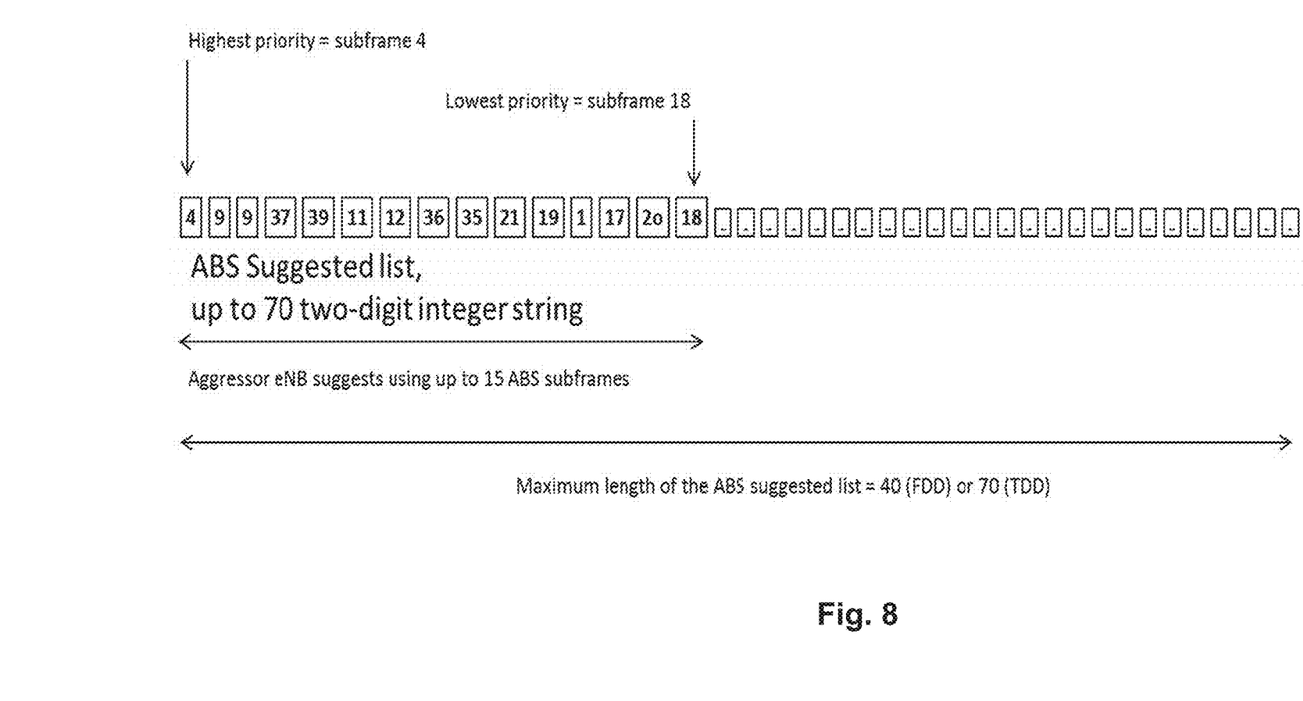
FIG. 8 is an example of an ABS Suggested List send by the aggressor eNB to the serving eNB according to an embodiment of the invention.

FIG. 8 is an example of an ABS Suggested List. In this example, the length of the ABS Suggested List is 15, and it indicates that the highest priority ABS subframe should be the ABS subframe 4, the next priority ABS subframe should be the ABS subframe 9, etc., and the lowest ABS subframe should be the ABS subframe 18.

Therefore, the communication process between the aggressor eNB and the victim eNB when the aggressor eNB provides an ABS Suggested List as is shown in FIG. 9 is as follows. The process starts when the aggressor eNB sends a Load Information message with a new ABS Pattern information, which will become effective when the System Frame Number is equal to 0. Then, the aggressor eNB sends a Resource Status Request message to the victim eNB setting the Reporting Characteristics 6th bit to 1 in order to request to the victim eNB to send its ABS Preferred List, and includes also the ABS Suggested List for that victim eNB. Finally, the victim eNB responds with a Resource Status Response message that includes the ABS Preferred List. The full process must be complete before the new ABS pattern comes into force when SFN=0, in order to allow the aggressor eNB to know the victim eNB's ABS Preferred List and the possibility to use some of the lowest priority ABS subframes.

The scope of the present invention is detailed in the following set of claims.

The invention claimed is:

1. A method to optimize almost blank subframe usage in a wireless network, wherein at least one serving base station provides wireless connectivity to at least one user terminal, said at least one user terminal suffering interference from at least one interfering base station, said method comprising:
    (a) generating, by said at least one interfering base station, in order to minimize said interference, an almost blank subframe pattern that said at least one interfering base station knows will not be needed, and sending said almost blank subframe pattern to said at least one serving base station,
    (b) generating, by said at least one serving base station, a set of preferred almost blank subframes, from said received almost blank subframe pattern, that said at least one serving base station determines have a high probability of being of use for providing said wireless connectivity based on requested traffic demand from said user terminal and prior to receiving any report of interference from said user terminal, and sending said set of preferred almost blank subframes ordered by a priority of usage to said at least one interfering base station; and
    (c) using, by said at least one interfering base station, in case of requiring use of additional subframes for serving user terminals of said at least one interfering base station, the almost blank subframes indicated as low priority in said received set of preferred almost blank subframes from said at least one serving base station.

2. The method according to claim 1, further comprising, said interfering base station, previous to said step (b), further sending to said serving base station a Resource Status Request message including in a Report Characteristics bit string an additional bit indicating which signals to said serving base station to send said set of preferred almost blank subframes.

3. The method according to claim 1, wherein said set of preferred almost blank subframes are generated autonomously by the serving base station.

4. The method according to claim 1, wherein said set of preferred almost blank subframes are sent as part of a Resource Status Response message.

5. The method according to claim 1, wherein said set of preferred almost blank subframes are generated by said serving station in response to an indication of said interfering base station, said indication starting which subframes of the almost blank subframe pattern to be used by said serving base station with a higher priority.

6. The method according to claim 5, further comprising, in response to a plurality of serving base stations being interfered by the interfering base station and said plurality of serving base stations not overlapping, providing, by the interfering base station, a same indication to all of said plurality of interfered serving base stations.

7. The method according to claim 5, further comprising, in response to a plurality of serving base stations being interfered by the interfering base station and said plurality of serving base stations overlapping, providing, by the interfering base station, different indications to each serving base station of said plurality of serving base stations.

8. The method according to claim 5, wherein said indication or indications are sent as part of the Resource Status Request message.

9. The method according to claim 1, wherein said set of preferred almost blank subframes and/or said indication or indications comprises a string of integers, having a maximum length of 40 integers for a FDD mode or of 70 integers for a TDD mode, every integer representing a subframe position in said almost blank subframe pattern of said interfering base station, ordered said string of integers from left for a highest priority subframe of said almost blank subframe to right for a lowest priority subframe of said almost blank subframe.

10. The method according to claim 9, wherein the set of preferred almost blank subframes comprises the same length of the almost blank subframe pattern.

11. The method according to claim 9, wherein the set of preferred almost blank subframes comprises a shorter length of the almost blank subframe pattern.

12. The method according to claim 11, wherein the subframes of said almost blank subframe pattern not included in said set of preferred almost blank subframes have a same priority, said same priority being lower than the lowest priority included in said set of preferred almost blank subframes.

13. The method according to claim 1, further comprising performing said step (c) before a new almost blank subframe pattern is generated by said at least one interfering base station.

14. The method according to claim 13, wherein a period of time between the performing of step (c) and the generation of said new almost blank subframe pattern is less than 10.24 seconds.

15. The method according to claim 1, wherein said at least one interfering base station comprises a macrocell and said at least one or plurality of serving base stations comprises a microcell.

* * * * *